United States Patent
d'Alencon et al.

(10) Patent No.: US 11,505,471 B2
(45) Date of Patent: Nov. 22, 2022

(54) MECHANOCHEMICAL SYNTHESIS OF RARE EARTH SULFIDES

(71) Applicant: RHODIA OPERATIONS, Aubervilliers (FR)

(72) Inventors: Lauriane d'Alencon, Issy-les-Moulineaux (FR); Thierry Le Mercier, Rosny-sous-Bois (FR); Marc-David Braida, Bry-sur-Marne (FR); Jacinthe Gamon, Paris (FR); Philippe Barboux, L'Haÿ-les-Roses (FR)

(73) Assignee: RHODIA OPERATIONS, Aubervilliers (FR)

( * ) Notice: Subject to any disclaimer, the term of this patent is extended or adjusted under 35 U.S.C. 154(b) by 23 days.

(21) Appl. No.: 16/769,831

(22) PCT Filed: Dec. 18, 2018

(86) PCT No.: PCT/EP2018/085701
§ 371 (c)(1),
(2) Date: Jun. 4, 2020

(87) PCT Pub. No.: WO2019/121819
PCT Pub. Date: Jun. 27, 2019

(65) Prior Publication Data
US 2020/0369529 A1    Nov. 26, 2020

(30) Foreign Application Priority Data
Dec. 18, 2017 (EP) .................... 17306810

(51) Int. Cl.
*C01F 17/00* (2020.01)
*C01F 17/288* (2020.01)

(52) U.S. Cl.
CPC ................ *C01F 17/288* (2020.01)

(58) Field of Classification Search
CPC ............... C01F 17/288; C01F 17/294
USPC ................................ 423/263, 21.1
See application file for complete search history.

(56) References Cited

U.S. PATENT DOCUMENTS 6,203,768 B1    3/2001    McCormick et al.

FOREIGN PATENT DOCUMENTS

CN    102515240 B    8/2015
GB    924976    *    5/1963

OTHER PUBLICATIONS

Tsuzuki, et al., "Mechanochemical Synthesis of Metal Sulphide Nanoparticles", Nanostructured Materials, Elsevier, New York, NY, US, vol. 12, No. 1-4, Jan. 1, 1999, pp. 75-78.
Han S. H., et al., "Preparation of a metastable high temperature phase (@c-Dy"2S"3) and a metastable high pressure phase (@c-Y"2S"3) by mechanical alloying and mechanical milling", Scripta Metallurgica et Materialia, Pergamon Press, GB, vol. 25, No. 2, Feb. 1, 1991, pp. 295-298.
Tsuzuki, et al., "Synthesis of Ultrafine Ce2S3 Powder by Mechanochemical Processing" Rare Earths '98—Materials Science Forum vols. 315-317 (1999) pp. 586-591.

* cited by examiner

*Primary Examiner* — Steven J Bos
(74) *Attorney, Agent, or Firm* — Osha Bergman Watanabe & Burton

(57) ABSTRACT

The present invention pertains to a process for preparing particles of rare earth sulfide comprising the steps of:—preparing a reaction mixture comprising at least one compound comprising at least one rare earth element (A) and at least one alkali metal sulfide (B),—submitting said reaction mixture to a mechanical stress so as to cause a chemical reaction that produces the particles of rare earth sulfide.

14 Claims, No Drawings

MECHANOCHEMICAL SYNTHESIS OF RARE EARTH SULFIDES

This application is a U.S. national stage entry under 35 U.S.C. § 371 of International Application No. PCT/EP2018/085701, filed on Dec. 18, 2018, which claims priority to European Application No. 17306810.7, filed on Dec. 18, 2017. The entire contents of these applications are explicitly incorporated herein by this reference.

The present invention pertains to a mechanochemical process for preparing particles of rare earth sulfide and to the resulting particles.

Particles of rare earth sulfides are known for their pigment, optical, luminescent, magnetic, electric or thermoelectric properties.

Generally, these particles are prepared by methods requiring not only high temperature but also requiring long reaction times. Moreover, several methods of preparation involve gaseous sulfur sources which are difficult to handle safely such as $H_2S$ and $CS_2$. These methods are often incompatible with cost efficiency, safety and environment friendly. In addition, methods of preparation do not allow producing crystalline nanoparticles having a very small median diameter and a very low polydispersity.

Mechanochemistry is the branch of chemistry which deals with the chemical effects of mechanical action. Mechanochemistry is advantageous because it requires very low demanding conditions, a little or even no solvent and because it augurs simple and thus sustainable industrial processes.

IUPAC defines a mechano-chemical reaction as a "Chemical reaction that is induced by the direct absorption of mechanical energy" with a note that "shearing, stretching, and grinding are typical methods for the mechano-chemical generation of reactive sites".

Reactants, generally in the solid state, optionally in the presence of a solvent, are submitted to a mechanical stress in such a way that a chemical reaction is activated or promoted.

There are some examples of rare earth sulfide particles prepared by mechanochemistry.

U.S. Pat. No. 6,203,768B1 describes a process for the production of ultrafine particles of rare earth sulfides, such as $La_2S_3$ or $Ce_2S_3$, via the stoichiometric reaction of rare earth chloride such as $LaCl_3$ or $CeCl_3$ with CaS triggered by mechanical activation under inert atmosphere. After washing in methanol in an ultrasound cleaner, particles having sizes ranging from 10 to 100 nm were recovered. However, very long reaction time up to 24 hours was necessary to obtain this result.

T. Tsuzuki et al. in Materials Science Forum, 1999, Vol. 315-317, p. 586-591 disclose the synthesis of $Ce_2S_3$ powder by mechanochemical processing. The mechanical grinding of a stoichiometric mixture of $CeCl_3$ and CaS gave after washing nanoparticles having sizes ranging from 20 to 200 nm. The reaction time was at least 4 hours for observing complete disappearance of the peaks corresponding to CaS onto X-ray diffraction (XRD) patterns. The same authors in Nanostructured Materials, 1999, vol. 12, p. 75-78 describe the influences of the grinding conditions onto the particle size of $Ce_2S_3$ obtained by mechanochemistry involving a stoichiometric mixture of $CeCl_3$ and of CaS.

The prior art processes, such as the above described ones, require long or even very long reaction times which are not compatible with cost efficiency. As a result of what, the processes according to prior art are not environment friendly.

There is a need for a rapid and efficient process for manufacturing particles of rare earth sulfide.

There is a need for a process which requires neither very demanding reaction conditions nor very drastic purification conditions.

There is also a need for a process capable of providing nanoparticles of rare earth sulfides which have a very small median diameter and, desirably too, a very low polydispersity.

All these needs and others are met by a process for preparing particles of rare earth sulfide comprising the steps of:
preparing a reaction mixture comprising at least one compound comprising at least one rare earth element (A) and at least one alkali metal sulfide (B),
submitting said reaction mixture to a mechanical stress so as to obtain a chemical reaction that produces the particles of rare earth sulfide. Usually, the produced rare earth sulfide compound corresponds to formula (1):

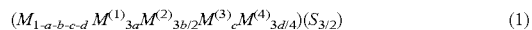

$$(M_{1-a-b-c-d} M^{(1)}_{3a} M^{(2)}_{3b/2} M^{(3)}_c M^{(4)}_{3d/4})(S_{3/2}) \quad (1)$$

wherein M is a first rare earth element at the oxidation state+3 selected from the list consisting of Sc, Y, La, Ce, Pr, Nd, Pm, Sm, Eu, Gd, Tb, Dy, Ho, Er, Tm, Yb and Lu and, wherein $M^{(1)}$ is an alkali metal at the oxidation state of +1 selected from the list consisting of Li, Na, K, Rb, Cs and Fr and,
wherein $M^{(2)}$ is a rare earth element at the oxidation state+2 selected from the list consisting of Sm, Eu, Tm and Yb and,
wherein $M^{(3)}$ is another rare earth element at the oxidation state of +3 selected from the list consisting of Sc, Y, La, Ce, Pr, Nd, Pm, Sm, Eu, Gd, Tb, Dy, Ho, Er, Tm, Yb and Lu and,
wherein $M^{(4)}$ is a rare earth element at the oxidation state of +4 selected from the list consisting of Ce, Pr, Nd, Tb and Dy and,
wherein S is at the oxidation state of −2, and
wherein $a+b+c+d \leq 1$ and,
$0 \leq a < 1$; $0 \leq b \leq 1$; $0 \leq c \leq 1$; $0 \leq d \leq 1$.

Some preferred sulfide compounds prepared by the process according to the invention correspond to formula (1) wherein $a=b=c=d=0$; then, the sulfide compounds correspond to the formula $M_2S_3$, for example to compounds $La_2S_3$, $Gd_2S_3$, $Sm_2S_3$, $Ce_2S_3$ and $Yb_2S_3$.

Other preferred sulfide compounds correspond to formula (1) wherein $a=c=d=0$ and $b=1$; then, the sulfide compounds correspond to the formula $M^{(2)}S$, for example to compounds SmS, YbS and EuS.

Still other preferred sulfide compounds correspond to formula (1) wherein $b=c=d=0$ and $a=¼$; then, the sulfide compounds correspond to the formula $MM^{(1)}S_2$, for example to compounds $LiCeS_2$, $LiYS_2$, $LiErS_2$, $LiHoS_2$, $LiDyS_2$, $NaLaS_2$, $NaCeS_2$ and $NaYS_2$.

Some other preferred sulfide compounds prepared by the process according to the invention correspond to formula (1) wherein $c=½$ and either $a=b=d=0$; then, the sulfide compounds correspond to the formula $MM^{(3)}S_3$, for example to compounds $PrGdS_3$, $NdGdS_3$ and $LaYbS_3$.

Still other preferred sulfide compounds correspond to formula (1) wherein $b=¼$, $c=⅜$ and $a=d=0$; then, the sulfide compounds correspond to the formula $MM^{(2)}M^{(3)}S_4$, for example to compound $EuSmGdS_4$.

The compound comprising at least one rare earth element (A) suitable for the process according to the invention is generally a rare earth halide responding to the general formula: $RE^{(n)}X_n$ with X an halogen atom at the oxidation state −1 and RE a rare earth element, selected from the list consisting of Sc, Y, La, Ce, Pr, Nd, Pm, Sm, Eu, Gd, Tb, Dy, Ho, Er, Tm, Yb and Lu, at the oxidation state +n, wherein n is equal to 2, 3 or 4. Preferably n is equal to 2 or 3, more preferably equal to 3. This compound is generally solid at room temperature and under atmospheric pressure and is considered hereafter as a solid reactant.

Generally the rare earth halide is selected from the list consisting of rare earth chlorides, rare earth bromides, rare earth iodides, rare earth fluorides and mixtures thereof. It is preferably chosen from the list consisting of rare earth bromides and rare earth chlorides and more preferably from rare earth chlorides.

The alkali metal sulfide (B) suitable, as sulfur source, for the process according to the invention corresponds to the formula $A_2S$, wherein A is an alkali metal. It is selected from the list consisting of $Li_2S$, $Na_2S$, $K_2S$, $Rb_2S$, $Cs_2S$, $Fr_2S$ and mixtures thereof. It is preferably selected from the list consisting of $Li_2S$, $Na_2S$ and $K_2S$, more preferably from $Li_2S$ and $Na_2S$ and even more preferably it is $Na_2S$. (B) is generally solid at room temperature and under atmospheric pressure and is considered hereafter as a solid reactant.

Some non-limitative examples of mixtures of compounds (A) and (B) are reported below:
- $Gd_2S_3$ can be prepared using a mixture comprising $GdCl_3$ and $Na_2S$ with a molar ratio 2:3; thus the chemical reaction equation is: $3 Na_2S + 2 GdCl_3 = Gd_2S_3 + 6 NaCl$.
- $NaYS_2$ can be prepared using a mixture comprising $YCl_3$ and $Na_2S$ in a molar ratio 1:2; thus the chemical reaction equation is: $2 Na_2S + YCl_3 = NaYS_2 + 3 NaCl$.
- $LaYbS_3$ can be prepared using a mixture comprising $LaCl_3$, $YbCl_3$ and $Na_2S$ with a molar ratio 1:1:3; thus the chemical reaction equation is: $3 Na_2S + LaCl_3 + YbCl_3 = LaYbS_3 + 6 NaCl$.
- EuS can be prepared using a mixture comprising $EuCl_2$ and $Na_2S$ with a molar ratio 1:1; thus the chemical reaction equation is: $Na_2S + EuCl_2 = EuS + 2 NaCl$.

In some special embodiments, the rare earth sulfide prepared by the process according to the invention is a doped compound. By doped is meant that some ions of the crystal lattice of the sulfide compound are replaced by other ions.

For the avoidance of doubt, formula (1) embraces doped sulfide compounds. However, the commonly used notation for such doped compounds is explained hereafter.

For example doped $Gd_2S_3$ can be prepared using a mixture comprising $GdCl_3$, $EuCl_3$ and $Na_2S$ with a molar ratio 2-x:x:3 wherein x is much lower than 1 (e.g. $0<x\leq0.15$). The resulting product is noted $Gd_2S_3$:x $Eu^{3+}$; x indicating the molar ratio of $Eu^{3+}$ replacing $Gd^{3+}$ in $Gd_2S_3$ lattice. A notation $Gd_2S_3$:$Eu^{3+}$ indicates that the $Gd_2S_3$ lattice is doped with $Eu^{3+}$ in an undetermined molar ratio.

Accordingly, the sulfide compound obtained by the process according to the invention can correspond to the following formulae:

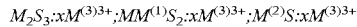

and, more particularly to:

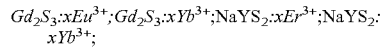

wherein $0<x\leq0.15$.

Generally, the compounds (A) and (B) are introduced in the reaction mixture under the form of solids in powder state. Said powder is generally composed of particles having a mean diameter of at least 500 nm, often of at least 1 µm, sometimes of at least 2 µm and rarely of at least 5 µm. Besides, the particles have generally a mean diameter of at most 5 mm, often of at most 1 mm, sometimes of at most 500 µm and more rarely of at most 250 µm. Good results were obtained with particles having a mean diameter ranging from 1 to 500 µm.

In some embodiments, the reaction mixture further comprises at least one solid (C) other than (A) and (B). This additional solid is usually chemically inert towards the solid reactants (A) and (B).

In preferred embodiments, (C) is a sub product of the desired reaction. Accordingly, when (A) is a rare earth halide, (C) is alkali metal halide.

For example NaCl can be added as solid (C) in the reaction mixture comprising $LaCl_3$ and $Na_2S$ wherein $3 Na_2S + 2 LaCl_3 = La_2S_3 + 6 NaCl$ is the reaction which is expected to occur and wherein NaCl is a sub product while $La_2S_3$ is the product. Accordingly, $La_2S_3$ can be prepared using a mixture comprising $LaCl_3$ and $Na_2S$ with a molar ratio 2:3 to which is additionally added solid NaCl. The chemical reaction equation can be expressed as follows:

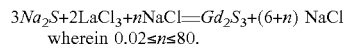

wherein $0.02 \leq n \leq 80$.

When present in the reaction mixture, (C) is generally used in a molar ratio of at least 0.01 with regard to the less represented solid reactant of the reaction mixture. It is sometimes used in a molar ratio of at least 0.1, rarely in a molar ratio of at least 0.5. Besides, (C) is generally used in a molar ratio of at most 40 with regard to the less represented solid reactant of the reaction mixture. It is sometimes used in a molar ratio of at most 20, rarely in a molar ratio of at most 5.

(C) is generally in powder state. Said powder is generally composed of particles having a mean diameter of at least 500 nm, often of at least 1 µm, sometimes of at least 2 µm and rarely of at least 5 µm. Besides, the particles have generally a mean diameter of at most 5 mm, often of at most 1 mm, sometimes of at most 500 µm and more rarely of at most 250 µm. Good results were obtained with particles having a mean diameter ranging from 1 to 500 µm.

In some embodiments, the reaction mixture comprises at least one liquid solvent. The solvent is generally chemically inert towards the solid reactants (A) and (B). The solvent is also generally chemically inert towards the solid (C) when the latest is present in the reaction mixture.

The solid components of the reaction mixture, i.e. solid reactants (A) and (B) and solid (C) when present, can be together or independently, partially solvated, completely solvated or not solvated by the solvent.

In some embodiments (A) and (B) or (A), (B) and (C) when it is present, are together or independently, partially solvated or not solvated by the solvent.

In some other embodiments (A) and (B) or (A), (B) and (C) when it is present, are not solvated by the solvent.

When used, the liquid solvent is generally used in a molar ratio of at least 0.01 with regard to the less represented solid reactant of the reaction mixture. It is sometimes used in a molar ratio of at least 0.1, rarely in a molar ratio of at least 0.5. Besides, the liquid solvent is generally used in a molar ratio of at most 40 with regard to the less represented solid reactant of the reaction mixture. It is sometimes used in a molar ratio of at most 20, rarely in a molar ratio of at most 5.

In preferred embodiments, the reaction mixture is substantially free or even free of any liquid solvent.

In other embodiments, the reaction mixture comprises at least one liquid solvent and at least one additional solid (C).

For example and without being exhaustive, suitable solvent can be selected from water, alcohols and mixtures thereof.

Mechano-chemical reaction as previously defined is a "chemical reaction that is induced by the direct absorption of mechanical energy" with a note that "shearing, stretching, and grinding are typical methods for the mechano-chemical generation of reactive sites".

In the process according to the present invention, submitting the reaction mixture to mechanical stress so as to obtain a chemical reaction that produces the rare earth sulfide is generally conducted in a grinding equipment well known by the skilled person for being suitable equipment for the mechano-chemical generation of reactive sites. Thus mechanical stress is generally provided by grinding together the solid reactants (A) and (B), optionally in the presence of the solid (C).

The grinding equipment is generally a mill. The principal types of mills which can be advantageously used in the process according to the present invention are: ball mill, planetary mill, vibration mill, mixer mill, attritor—stirring ball mill, pin mill and rolling mill.

When grinding equipment is used, the reaction mixture generally further comprises grinding media.

The grinding media are generally objects consisting of a rigid material.

The rigid material is generally a substantially non-porous material. The density of this non-porous material is generally not exceeding 20 g cm$^{-3}$, preferably not exceeding 15 g cm$^{-3}$ and even more preferably not exceeding 10 g cm$^{-3}$. Besides, the density of said material is generally of at least 1.5 g cm$^{-3}$, preferably of at least 2 g cm$^{-3}$ and even more preferably of at least 3 g cm$^{-3}$.

Just for the sake of example, the rigid material is selected from the list consisting of agate, corundum, zirconia, stainless steel, tempered steel, silicon nitride and tungsten carbide. Preferably, the rigid material is stainless steel or zirconia, and more preferably it is zirconia.

Generally the rigid material is chemically inert towards the solids comprised in the reaction mixture.

The objects are generally balls, beads, banded satellite spheres, rings and rods. The objects have generally a spherical or a cylindrical shape, preferably a spherical shape. Good results have been obtained with zirconia grinding balls.

When the objects are spherical or substantially spherical, they have a mean diameter generally not exceeding 150 mm, preferably not exceeding 50 mm, more preferably not exceeding 25 mm and even more preferably not exceeding 10 mm. The mean diameter is generally of at least 500 μm, preferably of at least 1 mm, more preferably of at least 2 mm and even preferably of at least 5 mm. Good results can be obtained with objects having a mean diameter comprised between 0.5 mm and 150.0 mm.

In some embodiments the grinding media are composed of objects of different mean diameter for example composed of smaller and larger objects.

The grinding equipment generally comprises a grinding chamber containing the reaction mixture. The chamber is usually consisting of a rigid material which may be or not of the same chemical nature as the material of the grinding media. Thus, just for the sake of example, the grinding chamber is generally consisting of a material selected from the list consisting of agate, corundum, zirconia, stainless steel, tempered steel, silicon nitride and tungsten carbide. Preferably, the grinding chamber is consisting of stainless steel or zirconia.

Good results have been obtained with grinding chamber consisting of zirconia.

Generally the grinding chamber is consisting of a material which is chemically inert towards the solids comprised in the reaction mixture.

Generally about at least 10% of the volume of the grinding chamber is empty, preferably at least 15%, more preferably at least 20% and even more preferably at least 25%. Furthermore, generally at most 70% of the volume of the grinding chamber is empty, preferably at most 60%, more preferably at most 50% and even more preferably at most 40%.

The grinding media are generally used in a weight ratio of at least 0.5, preferably of at least 1 and even more preferably of at least 2 with regard to (A) and (B). The weight ratio is generally not exceeding 100, preferably not exceeding 50 and even more preferably not exceeding 25. Good results are obtained with weight ratio ranging from 1 to 50.

The chamber is generally closed when the grinding equipment operates.

Grinding is generally conducted under inert atmosphere. Stirring can be conducted under nitrogen, argon or helium atmosphere. Preferably grinding is conducted under argon atmosphere.

Grinding is generally conducted at a temperature not exceeding 150° C., preferably not exceeding 100° C. and even more preferably not exceeding 50° C. Besides, grinding is generally conducted at a temperature of at least −5° C., preferably of at least 0° C., more preferably of at least 5° C. and even more preferably of at least 15° C. Good results were obtained at room temperature.

After reaction in the grinding chamber according to the invented process, the rare earth sulfide is generally recovered in the form of a powder comprising sub products of the reaction.

Sub products can be removed from said powder by techniques well known by the skilled person. For the sake of example, sub products can be washed off by using appropriate solvent. Good results were obtained using methanol as the solvent.

The rare earth sulfide is then recovered by filtration and further dried until constant weight.

The rare earth sulfide is obtained as a powder which comprises primary particles and agglomerates of these primary particles.

Deagglomeration of the agglomerates of primary particles can be achieved by any process well known by the person skilled in the art.

Just by way of example, deagglomeration can be achieved by grinding the powder using a ball mill in a wet process involving a solvent and optionally a dispersing agent.

Preferably, deagglomeration is achieved by ultrasound treatment. For example, the powder can be dispersed in a liquid medium comprising at least one solvent or water or a mixture thereof and optionally a dispersing agent. Then the dispersion is submitted to ultrasound vibrations, which are applied using a probe, until complete deagglomeration of the particles is observed.

The particles of the rare earth sulfide according to the invented process are generally submicronic particles.

Preferably, the median diameter D(50) of the particles is of at most 200 nm; more preferably, it is of at most 100 nm; still more preferably, it is of at most 50 nm. On the other hand, the median diameter D(50) of the particles is generally of at least 1 nm; it can be of at least 2 nm, at least 5 nm or at least 10 nm.

The particle size distribution can be determined by dynamic light scattering using the Zetasizer Nano ZS from Malvern Instruments equipment and the related software, following the recommendations of the provider.

Particles size distribution can be determined on an alcohol suspension comprising 10 wt. %, with regard to alcohol, of a sample of powder and comprising from 1 wt. % to 5 wt. %, with regard to the sample, of cysteine as dispersing agent. If necessary, for deagglomeration of the particles, ultrasound vibrations can be applied during 5 min. using a Vibra-Cell™ 75186 high intensity ultrasonic processor equipped with a 13 mm probe at a power output of 130 watts. For example, suitable alcohol may be methanol, ethanol or 2-propanol.

The median diameter D(50) is the size, on the cumulative curve in volume of the distribution, at which 50% of the particles of the sample are smaller and 50% are larger.

Besides, the relative span of the particles according to the invented process is advantageously of at most 3. Preferably, it is of at most 2; more preferably, it is of at most 1.5; still more preferably, it is of at most 1. In most preferred embodiments, it is of at most 0.75 or at most 0.5. The lower the polydispersity of the particles according to the invented process is, the lower their relative span.

The relative span is defined as below:

relative span=$(D(90)-D(10))/D(50)$ wherein D(10) is the size, on the cumulative curve in volume of the distribution, at which 10% of the particles are smaller and D(90) is the size at which 90% of the particles are smaller. D(10), D(50) and D(90) are determined by dynamic light scattering as previously discussed.

In preferred embodiments, the particles of rare earth sulfide according to the invented process are crystalline. The crystalline nature of the compounds can be typically revealed by X-ray crystallography determination which provides a diffraction pattern. The crystalline particles according to the invented process generally comprise at least one crystallite to which is associated a coherently scattering range obtained by X-ray diffraction.

The crystallite average size can be determined using X-ray powder diffraction and corresponds to the size of the coherent range calculated based on the breadth of the two most intense diffraction lines and using the Scherrer model. Assuming that the shape of the crystallite is spherical, the median diameter of the at least one crystallite comprised in the particles according to the invented process is generally ranging from 1 nm to 200 nm and preferably from 10 nm to 100 nm.

In a preferred embodiment, the particles according to the invented process are composed of one and only one crystallite. In this preferred embodiment, the median diameter of the particles according to the invented process is generally ranging from 1 nm to 200 nm and preferably from 10 nm to 100 nm.

It is another object of the invention to provide crystalline nanoparticles having a very small median diameter, desirably too a very low polydispersity. To this end, the present invention concerns particles of rare earth sulfide comprising at least one rare earth element, wherein the particles have all the characteristics of the particles obtained by the process according to the invention in terms of median diameter D(50), span, and crystallinity.

The chemical nature of the invented particles can be in accordance with any of the above described embodiments related to the particles prepared by the invented process, meeting notably all the expressed preferences at whatever level of preference.

Thus, just for the sake of example, some preferred particles are particles of a chalcogenide compound corresponding to a formula chosen from $La_2S_3$, $Gd_2S_3$, $Sm_2S_3$, $Ce_2S_3$, $Yb_2S_3$, SmS, YbS, EuS, $LiCeS_2$, $LiYS_2$, $LiErS_2$, $LiHoS_2$, $LiDyS_2$, $NaLaS_2$, $NaCeS_2$, $NaYS_2$, $PrGdS_3$, $NdGdS_3$, $LaYbS_3$, and $EuSmGdS_4$.

Still for the sake of example, some other preferred particles are particles of a chalcogenide compound corresponding to a formula chosen from:

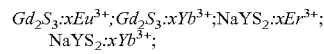

$Gd_2S_3{:}xEu^{3+}; Gd_2S_3{:}xYb^{3+}; NaYS_2{:}xEr^{3+};$
$NaYS_2{:}xYb^{3+};$ wherein $0<x\leq0.15$.

EXAMPLES

In each example and comparative example, the reaction was conducted under atmosphere of Argon, the molar ratio between $LaCl_3$ and the respective sulfur source was kept constant (⅔) and the weight ratio between powder reactants and zirconia grinding balls was also kept constant.

Example 1: Mechanochemical Synthesis of $La_2S_3$ Using $Na_2S$

In a glove box under Argon atmosphere, 1.962 g (8.0.10$^{-3}$ mol) of anhydrous $LaCl_3$ and 0.936 g (12.0.10$^{-3}$ mol) of $Na_2S$ were introduced in a zirconia grinding bowl. 18 zirconia grinding balls of 10 mm diameter were then added and the bowl closed and inserted in the planetary ball mill Pulverisette 7® available from Fritsh. The rotation speed of the bowl was set at 500 rpm for 20 min. followed by 10 min. pause. The cycle was repeated 4 times so that the overall effective grinding time was 80 min. The crude product was recovered as a powder which was then dispersed in absolute methanol in order to solubilize NaCl formed. Typically 1 g of resulting powder was dispersed in 100 ml of methanol under stirring for 2 hours using an ultrasonic water bath Bransonic® 221 provided by Branson.

After what the dispersion was filtered over a Buchner funnel, the recovered powder was washed with methanol and dried under vacuum at 40° C. until constant weight was obtained. SEM images showed that the resulting $La_2S_3$ powder after washing with MeOH was composed of agglomerated nanoparticles.

Example 2: Mechanochemical Synthesis of $La_2S_3$ Using $Li_2S$

The same procedure was carried out using 2.264 g (9.2.10$^{-3}$ mol) of $LaCl_3$ and 0.635 g (13.8.10$^{-3}$ mol) of $Li_2S$. SEM images showed that the resulting $La_2S_3$ powder after washing with MeOH was composed of agglomerated nanoparticles.

Example 3: Mechanochemical Synthesis of $Gd_2S_3$ Using $Na_2S$

The same procedure was carried out using 2.003 g (7.6.10$^{-3}$ mol) of $GdCl_3$ and 0.889 g (11.4.10$^{-3}$ mol) of $Na_2S$. SEM images showed that the resulting $Gd_2S_3$ powder after washing with MeOH was composed of agglomerated nanoparticles.

COMPARATIVE EXAMPLE

The same procedure was carried out using 2.012 g (8.2.10$^{-3}$ mol) of $LaCl_3$ and 0.887 g (12.3.10$^{-3}$ mol) of CaS.

When comparing results from examples 1 and 2 with results from comparative example, XRD experiments conducted onto the crude products revealed, on one hand, that the reaction gave the expected product namely $La_2S_3$ when $Na_2S$ or $Li_2S$ were employed as sulfur source and, on the other hand, that the reaction did not or almost did not occur when CaS was used since no $La_2S_3$ was detected in that case.

Moreover, XRD experiments conducted onto the crude products showed that $Na_2S$ was consumed since no remaining $Na_2S$ was detected, that $Li_2S$ was almost totally consumed since remaining $Li_2S$ was detected in low quantity and that CaS was almost unreactive since it was the only compound detected with $LaCl_3$. Thus unexpectedly, the reaction rate was improved when replacing CaS by $Li_2S$ or $Na_2S$.

X-Ray diffraction measurements were performed with X'Pert PRO® diffractometer available from PANalytical, using copper's $K\alpha1$ and $K\alpha2$ radiations ($\lambda=1.54056$ Å and $\lambda=1.54439$ Å respectively) in the Bragg-Brentano geometry.

Scanning Electron Microscopy (SEM) was carried out thanks to a Zeiss Leo 1525 apparatus equipped with an in-lens detector operating at 3 kV.

SEM images revealed that the resulting $La_2S_3$ and $Gd_2S_3$ powders after washing with MeOH were composed of agglomerated nanoparticles.

Measurements of sulfur content were carried out onto samples of product obtained after washing with methanol. The titration was performed by induced coupled plasma with an optical emission spectroscopy detector (ICP-OES) performed on PlasmaQuant® PQ 9000 from Analytik Jena. The samples were solubilized in concentrated aqueous $HNO_3$ solution by heating in a microwave oven. The limpid solution was diluted in a nitric acid 5% aqueous solution. The intensity measured on the Sulfur specific wavelength (eg. 180.669 nm and 181.975 nm) was compared to a calibration curve in the range of 0.05 to 22.0 mg/L of sulfur standards obtained in similar analytical conditions in order to determine the amount in the diluted solution. The amount in the solution was obtained by calculation using the dilution factor.

As $La_2S_3$ was the only sulfur containing compound detected by XRD in the product after washing, the sulfur content was attributed to $La_2S_3$ only. The yield of $La_2S_3$ is reported in table 1.

prising cristallites having a mean diameter of 15 nm. This diameter was calculated using the Scherrer model as previously described.

The invention claimed is:

1. A process for preparing particles of rare earth sulfide comprising the steps of:
    preparing a reaction mixture comprising at least one compound comprising at least one rare earth element (A) and at least one alkali metal sulfide (B),
    submitting said reaction mixture to a mechanical stress so as to cause a chemical reaction that produces the particles of rare earth sulfide.

2. The process according to claim 1, wherein (A) is a rare earth halide.

3. The process according to claim 2, wherein the rare earth halide is a rare earth chloride.

4. The process according to claim 3, wherein the rare earth chloride is $CeCl_3$, $GdCl_3$, $LaCl_3$ or a mixture thereof.

5. The process according to claim 4, wherein the rare earth chloride is $LaCl_3$.

6. The process according to claim 1, wherein mechanical stress is provided by grinding together (A) and (B), optionally in the presence of at least one alkali metal halide (C).

7. The process according to claim 1, wherein the alkali metal sulfide (B) is $Na_2S$.

8. The process according to claim 1, wherein the reaction mixture further comprises at least one solvent.

9. The process according to claim 1, wherein the reaction mixture further comprises grinding media which are objects consisting of a rigid material.

10. The process according to claim 9, wherein the objects are balls, beads, banded satellite spheres, rings or rods.

11. The process according to claim 9, wherein the objects are substantially spherical and have a mean diameter ranging from 0.5 mm to 150.0 mm.

12. The process according to claim 9, wherein the rigid material is selected from the list consisting of agate, corundum, zirconia, stainless steel, tempered steel, silicon nitride, tungsten carbide and mixtures thereof.

TABLE 1 sulfur content in the resulting product and yield of $La_2S_3$

| Example | S source | Recovered crude product (wt. %) | Recovered product after washing in methanol (wt. %) | Sulfur content in the washed product ICP/OES (wt. %) | $La_2S_3$ content in the product (wt. %) | $La_2S_3$ theoretical content in the product (wt. %) | $La_2S_3$ yield (%) |
|---|---|---|---|---|---|---|---|
| 1 | $Na_2S$ | 100 | 42 | 11.4 | 44.4 | 51.6 | 36.1 |
| 2 | $Li_2S$ | 100 | 58 | 9.4 | 36.6 | 59.5 | 35.7 |
| comparative | CaS | 100 | 10 | n.d.* | n.d.* | 52.9 | 0** |

*n.d. = not determined
**yield assumed to be equal to 0 because, as previously mentioned, no $La_2S_3$ was detected by XRD The results summarized in table 1 clearly reveal the advantage of using alkali metal sulfide such as $Li_2S$ or $Na_2S$ for the mechanochemical synthesis of $La_2S_3$ starting from $LaCl_3$.

Moreover, XRD experiments performed onto products resulting from examples 1 and 3 revealed that the obtained $La_2S_3$ and $Gd_2S_3$ powders were composed of particles com- 13. The process according to claim 12, wherein the rigid material is zirconia.

14. The process according to claim 9, wherein the weight ratio of the grinding media with regard to (A) and (B) is ranging from 1 to 50.

* * * * *